(12) United States Patent
Ranki et al.

(10) Patent No.: US 9,352,806 B2
(45) Date of Patent: May 31, 2016

(54) WATERCRAFT WITH IMPROVED CHARACTERISTICS FOR TRAVEL IN ICE

(75) Inventors: Erkki Ranki, Helsinki (FI); Tom Mattsson, Helsinki (FI); Maximilian Vocke, Helsinki (FI)

(73) Assignee: AKER ARCTIC TECHNOLOGY OY, Helsinki (FI)

( * ) Notice: Subject to any disclaimer, the term of this patent is extended or adjusted under 35 U.S.C. 154(b) by 140 days.

(21) Appl. No.: 13/977,197

(22) PCT Filed: Dec. 20, 2011

(86) PCT No.: PCT/FI2011/051141
§ 371 (c)(1),
(2), (4) Date: Aug. 6, 2014

(87) PCT Pub. No.: WO2012/089917
PCT Pub. Date: Jul. 5, 2012

(65) Prior Publication Data
US 2015/0020723 A1    Jan. 22, 2015

(30) Foreign Application Priority Data
Dec. 30, 2010   (FI) ..................................... 20106388

(51) Int. Cl.
| B63H 5/07 | (2006.01) |
| B63B 35/08 | (2006.01) |
| B63H 1/04 | (2006.01) |
| B63H 5/125 | (2006.01) |
| B63H 5/15 | (2006.01) |
| B63H 25/38 | (2006.01) |
| B63H 25/42 | (2006.01) |

(52) U.S. Cl.
CPC .............. *B63B 35/083* (2013.01); *B63B 35/08* (2013.01); *B63H 1/04* (2013.01); *B63H 5/125* (2013.01); *B63H 5/15* (2013.01); *B63H 25/38* (2013.01); *B63H 25/42* (2013.01)

(58) Field of Classification Search
CPC ...... B63B 35/00; B63B 35/08; B63B 35/083; B63B 35/12; B63H 1/00; B63H 1/02; B63H 1/04; B63H 1/10; B63H 5/00; B63H 5/125; B63H 5/15; B63H 25/38; B63H 25/42
USPC ............ 114/271, 278, 40–43; 440/40–43, 49, 440/66, 67, 76, 79, 80, 82
See application file for complete search history.

(56) References Cited

U.S. PATENT DOCUMENTS

| 4,428,735 A | 1/1984 | Gruzling et al. |
| 2008/0009208 A1* | 1/2008 | Levander .................. B63B 1/08 440/113 |

\* cited by examiner

*Primary Examiner* — Daniel V Venne
(74) *Attorney, Agent, or Firm* — Miller, Matthias & Hull LLP

(57) ABSTRACT

The invention relates to a watercraft having improved characteristics for travel in ice, particularly an icebreaker, supply vessel, cargo vessel or corresponding, which watercraft has a hull, which has at the stern portion a propulsion and steering arrangement, which is mainly responsible for movement and steering of the watercraft and which includes at least one skeg, in which is located at least one propeller device. In accordance with the invention, said skegs comprise two units located on different sides of the center line of the hull. Said propeller device is located at the stern end of the skeg. In addition, the skeg has between the propeller device and the hull of the watercraft, in the longitudinal direction on the skeg, one or more thruster devices to provide a water flow mainly transverse in relation to the hull.

12 Claims, 7 Drawing Sheets

WATERCRAFT WITH IMPROVED CHARACTERISTICS FOR TRAVEL IN ICE

FIELD OF THE DISCLOSURE

The invention relates to a watercraft according to the preamble of claim 1 with improved characteristics for travel in ice, particularly an icebreaker, supply vessel, or cargo vessel, which watercraft has a hull, which has at the stern portion a propulsion and steering arrangement, which is provided for movement and steering of the watercraft and which includes one or more skegs.

BACKGROUND OF THE DISCLOSURE

The steerability of an icebreaker or a supply ship working in ice-covered water is an extremely important characteristic. Traditionally, such a vessel is equipped with one or more propellers and a rudder located behind the propeller. An extremely efficient alternative propulsion and steering arrangement is a turnable steering thruster device. The patent FI 94508 presents one solution, in which the vessel moves under difficult ice conditions stern forward utilizing steering thrusters.

As the main propellers of a ship can be used traditional propeller shaft solutions, in which the driving mechanism inside the hull of the vessel rotates the propeller via a propeller shaft that is led through the hull and is often quite long. To increase the efficiency of steering, under these circumstances, it is common to equip the vessel with a thruster installed in a transverse tunnel, by which is provided a transverse water flow and steering reaction force. These kinds of propellers are generally installed in the bow of a vessel, but also in the area of the stern, in a middle skeg or side skegs independent of the ordinary propeller shaft lines.

In steering thruster solutions, neither tunnel thrusters nor rudders are usually needed. The propeller drives are arranged either inside a turnable pod, or the operation is arranged via shafts and angle gears by a motor located in the hull of the ship.

It is obvious that the dimensions and structure of the components, which will be in contact with ice, must be selected taking into consideration the stress created by the ice.

Although a steering thruster device is quite efficient solution for propulsion device and for steering of a ship, cases do occur, in which significant problems are related to its use. Such cases are the loads created by particularly thick and/or multi-year ice. In these cases, an arrangement is often selected, which has one or more traditional propellers and propeller shafts. To assure steerability, also at a slow travelling speed and when the ship is stationary, it is, in this case, necessary to use transversely installed tunnel thrusters.

FIGS. 1a, 1b and 1c show an arrangement, which has two shaft lines 2 and 3 and one middle skeg 6, in which is located two tunnel thrusters 7a and 7b. In this arrangement, the operating ability of the vessel in ice is weakened due to the fact that the middle skeg hinders the free movement of broken ice chunks. Support from below for the rudder and a possible propeller nozzle is also difficult to implement, which is likely to weaken the ability of the structure to withstand ice chucks when travelling in icy waters.

SUMMARY OF THE DISCLOSURE

An object of the invention is to provide a watercraft having improved characteristics for travel in ice and which minimizes the problems of known art described above. In particular, an object is to attempt to secure the steerability of the watercraft under ice conditions as well as to improve its ability to withstand the stress inflicted on the structures of the watercraft by ice and ice chunks.

The objects of the invention are mainly achieved in the manner presented in claim 1 and more in detail in the other claims. In accordance with the invention, the hull of the watercraft includes two skegs, which are situated on different sides of the center line of the hull and which include a propeller device with a propeller located at a stern end or a stern side of the skeg and wherein each of the two skegs has between the propeller device and the hull of the watercraft, in a longitudinal direction of the skeg, at least one thruster device to provide a water flow transversely in relation to the center line of the hull.

The arrangement according to the invention is based on the fact that a propeller device located in or in connection with a skeg is selected such that the space required by a propeller shaft of the propeller device, in the longitudinal direction of the skeg, is so short that between the propeller device and the hull of the watercraft can be located one or more thruster devices to assure the steerability of the watercraft. The solution also enables as free as possible movement of broken ice chunks under the watercraft between the skegs, because, due to the solution according to the invention, there is enough space under the hull so that the skegs can be located adequately far from each other. In addition, by using the thruster devices of different skegs in opposite directions outward from the hull, there can be provided a water flow substantially transverse in relation to the hull, by which the board of the watercraft can be flushed to reduce the friction between the hull and the ice and ice chunks, and, secondly, to clear the ice chunks from the channel broken in the ice field.

The propeller device can be implemented in various ways. For this purpose can be used a steering thruster device, the turning of which in relation to the skeg is prevented. In this case, the propeller device receives its immediate operating power from an electric motor, which can be located in the skeg, for example, at the stern side of said one or more thruster devices. The electric motor can be in the immediate vicinity of the propeller or so short a propeller shaft is used for the purpose that the solution according to the invention can be implemented. Naturally, the electric motor can also be located, conventionally, on the deck above the propeller device or in a space specifically reserved for it, from which power is transferred in a manner known per se by using a vertical shaft and an angle gear mechanism.

Said thruster device can also be implemented in various ways. The thruster device can preferably be a tunnel thruster, which is most preferably arranged such that the water flow it provides is directed diagonally upwards. This is likely to increase the efficiency of the flushing effect it provides.

Preferably, the thruster device can also be movable from a first position, in which the thruster device is, at least mainly, inside the skeg, into a second position, in which the thruster device is, at least mainly, pushed out from the skeg. In addition, the thruster device can be arranged to be rotated in relation to a mainly vertical shaft of the thruster device extending in the direction of movement between the first position and the second position. Thus, the thruster device can function in the manner of a tunnel thruster, when in a retracted position, and when in a lowered-down position, it can respectively function as a steering and propulsion device. Also in this case it is preferred that the water flow provided by the thruster device is directed diagonally upward.

Attached to the hull, there can also be a rudder device on the stern side of said propeller device. The propeller device, in turn, can be equipped with a nozzle surrounding the propeller, as needed. In this case, said nozzle and most preferably also said rudder device can preferably be supported to said skeg from below. This is prone to strengthen the ability of the structures to withstand the stress applied thereto by the ice chunks.

BRIEF DESCRIPTION OF THE DRAWINGS

In the following, the invention is described by way of example with reference to the accompanying schematical drawings, in which.

DETAILED DESCRIPTION OF THE DISCLOSURE

Figure 1A:
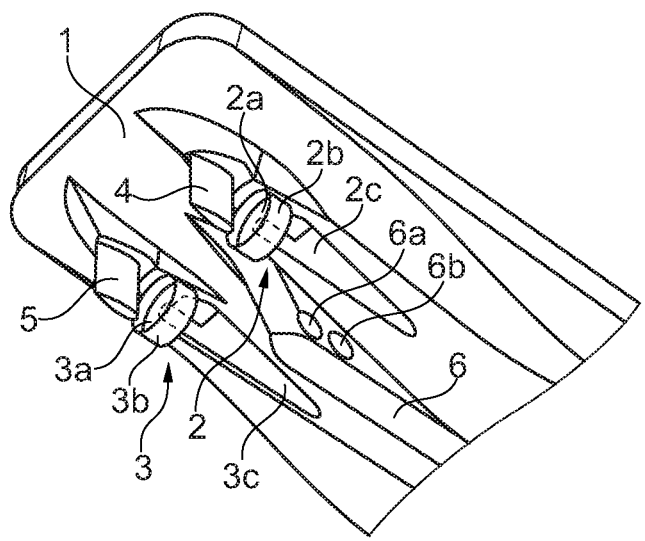
FIGS. 1a, 1b and 1c show a known propulsion and steering arrangement of the stern portion of a known watercraft, as viewed obliquely from below, from the side and from below and partially in cross-section.
Figure 1B:
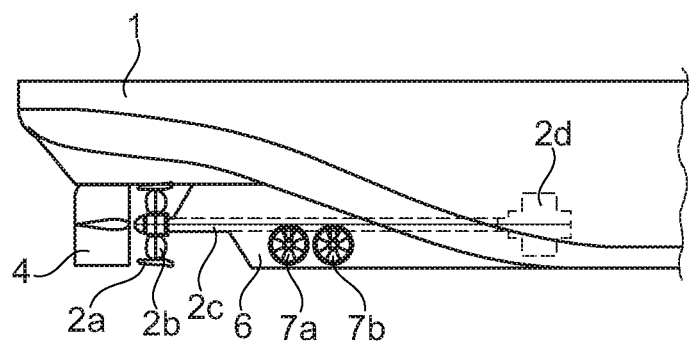
Figure 1C:
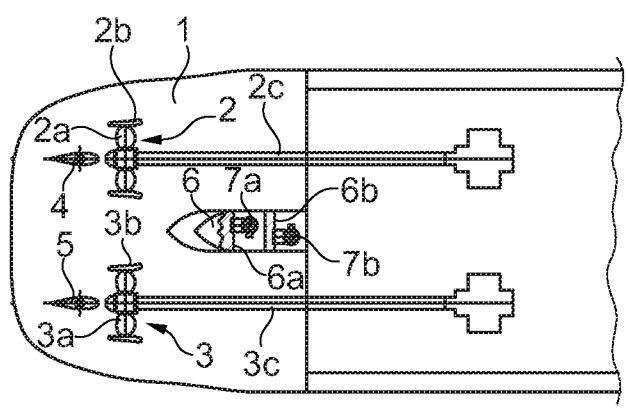

FIGS. 1a, 1b and 1c show an arrangement, in which the stern portion of the hull 1 of the watercraft has two shaft lines 2 and 3 and one middle skeg 6. The shaft lines 2 and 3 include propellers 2a and 3a and nozzles 2b and 3b surrounding them, as well as propeller shafts 2c and 3c, which connect the propellers to motors 2d and 3d. The middle skeg 6 has tunnel openings 6a and 6b for tunnel thrusters 7a and 7b. Associated with the shaft lines are additionally rudders 4 and 5. Disadvantages of the solution are described above in the section relating to prior art.

FIGS. 2-7 show various alternative solutions for the invention. These have in common that the stern portion of the hull 1 of the watercraft has two skegs 8 and 9, which are equipped with propeller devices 10 and 11, which are attached to the skegs 8 and 9 such that propellers 10a and 11a of the propeller devices 10 and 11 cannot be turned in relation to the skegs. In addition, on the stern side of the skegs are rudder devices 4 and 5. Alternatively, the propeller devices can be located on a stern side of the skegs and can be turned to a limited extent in relation to the skegs.

The propeller devices 10 and 11 are selected and their power transmission is arranged such that there is no need for a long power transmission shaft extending along the skeg. In practice, power is obtained via electric motors in a manner known to a person of skill in the art, so it is not further described here. Thus, in front of the propulsion units of the skegs 8 and 9 in relation to the hull of the watercraft, there are, additionally, situated different types of thruster devices 12, 12' or 12", which provide water flows transverse in relation to the skegs 8 and 9. By utilizing these, it is possible to improve the steerability of the watercraft as well as its properties for travel in ice depending on the direction, in which the water flows are directed. Accordingly, for example, the board of the watercraft can be flushed to reduce the friction between the hull and ice and ice chunks by guiding the water flow upward from the hull, or the ice chunks can be cleaned from the channel broken in the ice field.

Figure 2A:
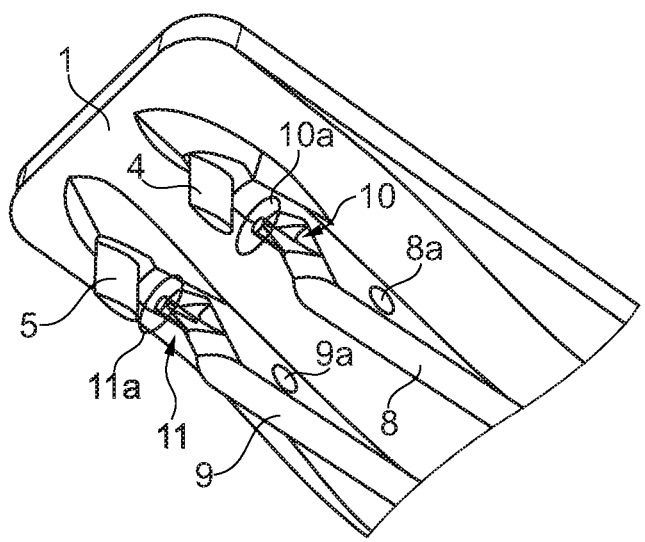
FIGS. 2a, 2b and 2c show a first embodiment of the invention, in which the propulsion and steering arrangement of the stern portion of the watercraft is shown obliquely from below, from the side and from below and partially in cross-section.
Figure 2B:
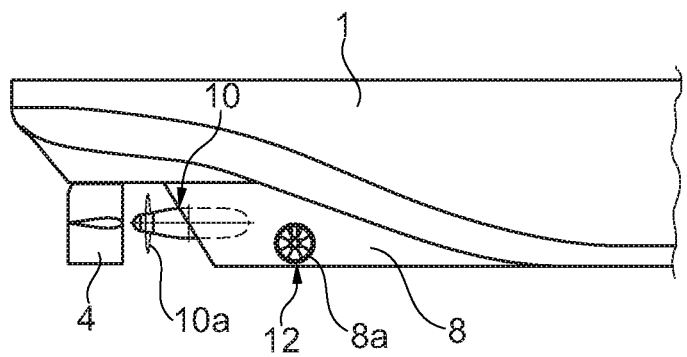
Figure 2C:
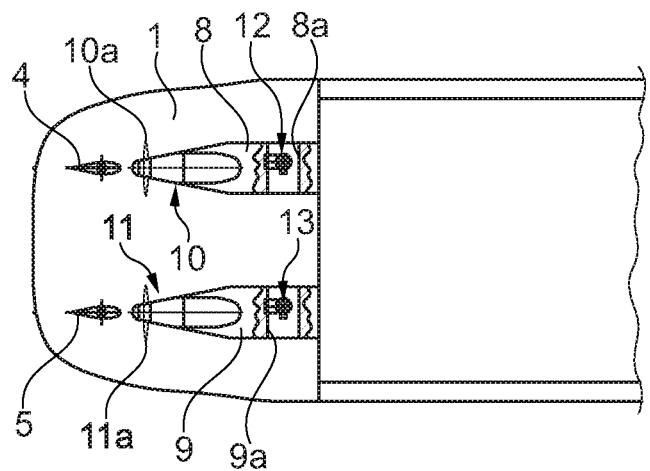

In the embodiment of FIGS. 2a, 2b and 2c, the thruster devices are used as tunnel thrusters 12 and 13, which are located in transverse tunnel openings 8a and 9a of the skegs. As needed, there can also be several tunnel thrusters in each of the skegs.

Figure 3A:
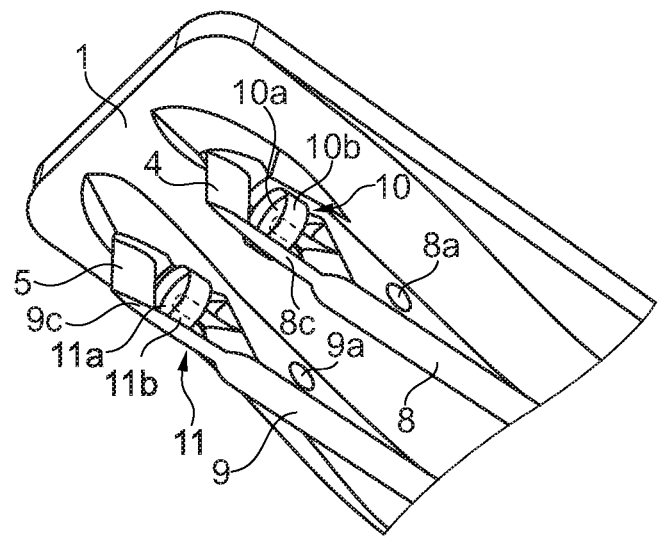
FIGS. 3a, 3b and 3c show a second embodiment of the invention, in which the propulsion and steering arrangement of the stern portion of the watercraft is shown obliquely from below, from the side and from below and partially in cross-section.
Figure 3B:
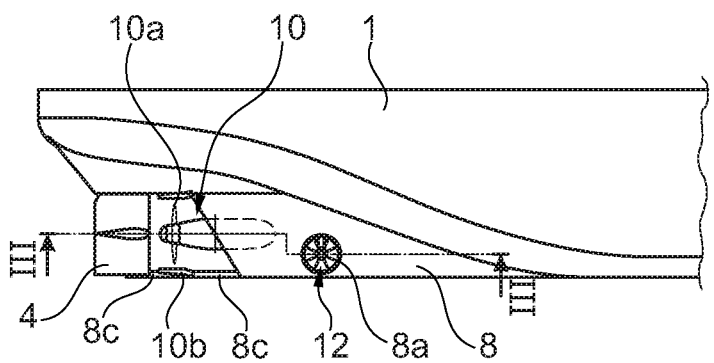
Figure 3C:
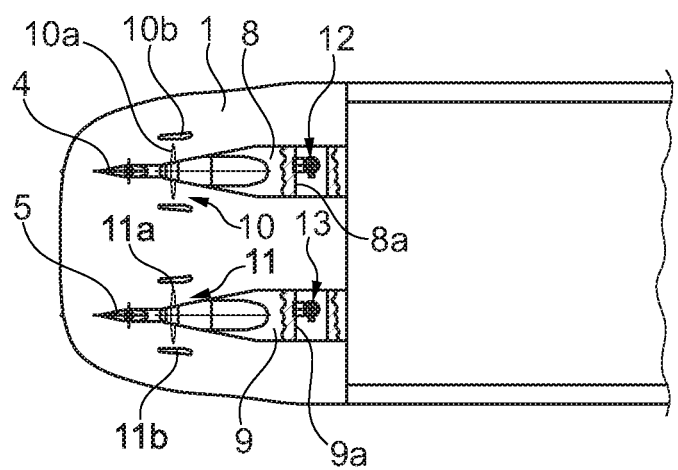

The embodiment of FIGS. 3a, 3b and 3c differs from the previous embodiment in that, around the propellers, there are nozzles 10b and 11b, which direct the water flow provided by the propellers and, at the same time, protect the propellers. In addition, the rudder devices 4 and 5 as well as the nozzles 10b and 11b are supported from below by support elements 8c and 9c, which are attached to the lower part of the skegs 8 and 9. Support of this type is prone to substantially strengthen the structure against the stress created by ice chunks. If desired, the support can also extend only to the nozzles.

Figure 4A:
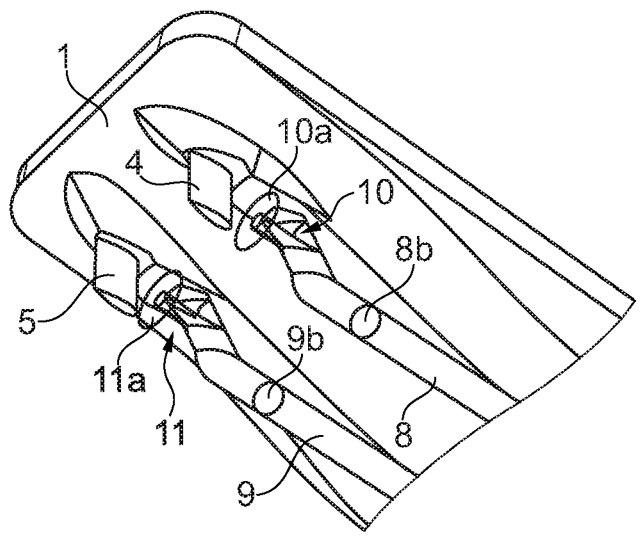
FIGS. 4a, 4b and 4c show a third embodiment of the invention, in which the propulsion and steering arrangement of the stern portion of the watercraft is shown obliquely from below, from the side and from below and partially in cross-section.
Figure 4B:
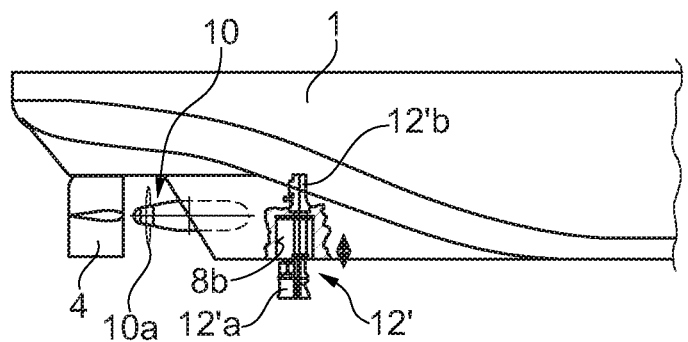
Figure 4C:
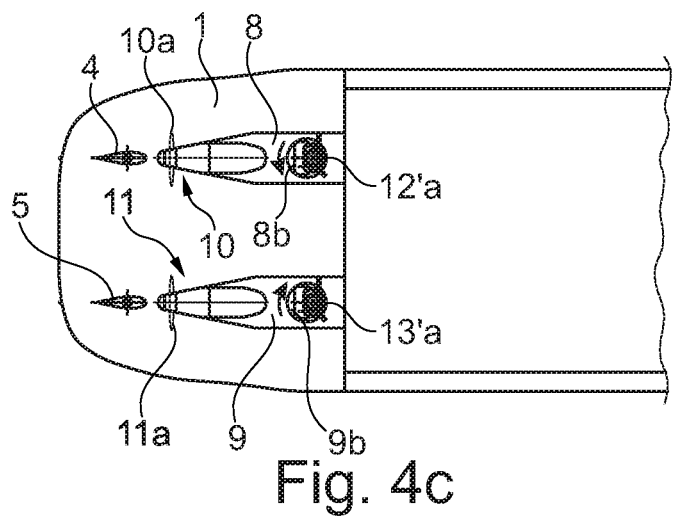

In the embodiment of FIGS. 4a, 4b and 4c propeller units 12'a and 13'a serve as thruster devices 12' and 13' and they are driven by motors 12'b and 13'b and can be lowered from inside to down below skegs 8 and 9. In their retracted position, these devices are located in vertical tunnel openings 8b and 9b in the skegs 8 and 9. In their protruding position, these propeller units can be rotated around their shaft, wherein water flows can, as needed, respectively be directed in different directions.

Figure 5A:
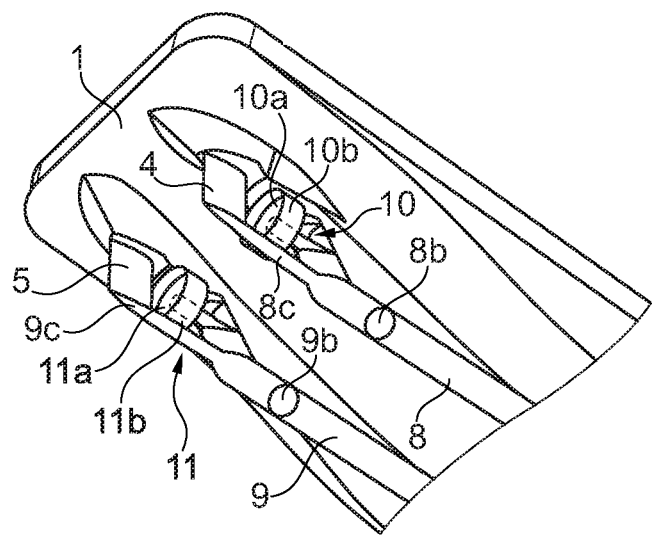
FIGS. 5a, 5b and 5c show a fourth embodiment of the invention, in which the propulsion and steering arrangement of the stern portion of the watercraft is shown obliquely from below, from the side and from below and partially in cross-section.
Figure 5B:
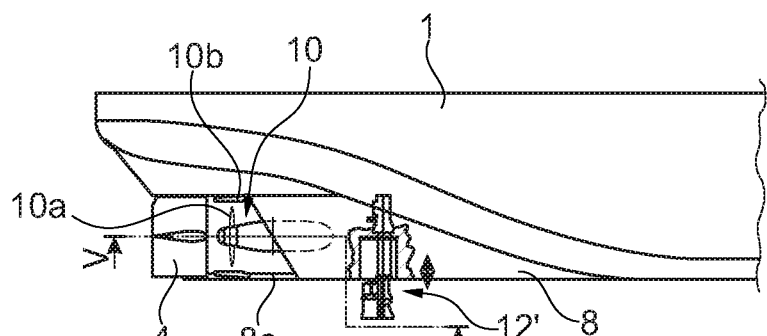
Figure 5C:
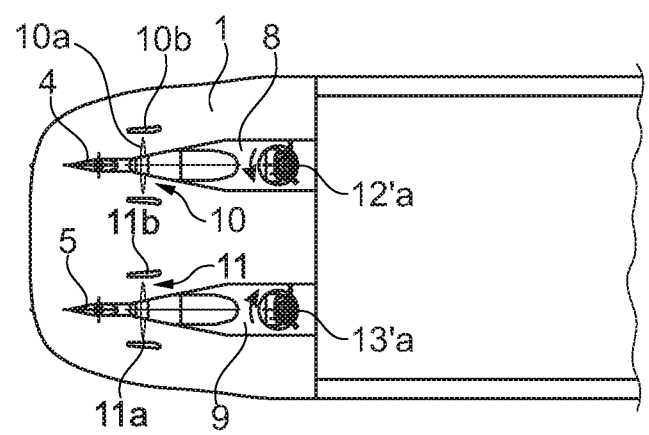

The embodiment of FIGS. 5a, 5b and 5c differs from the embodiment of FIG. 4 just as the embodiment of FIG. 3 differs from the embodiment of FIG. 2, i.e. here as well, the propellers 10a and 11a are equipped with nozzles 10b and 11b and, additionally, the solution is equipped with support elements 8c and 9c.

Figure 6A:
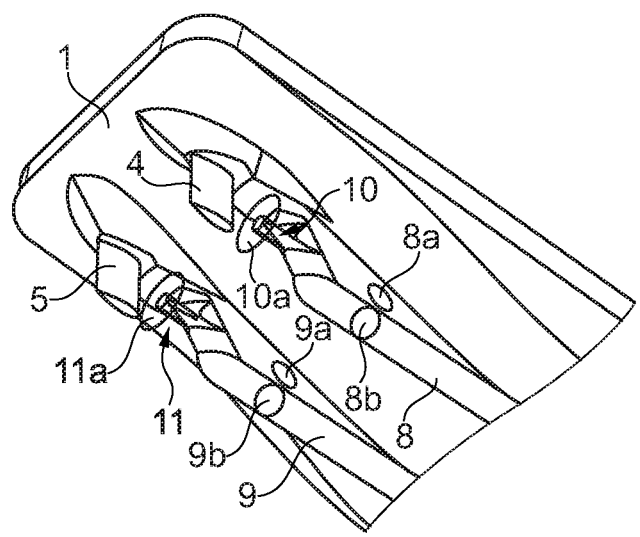
FIGS. 6a, 6b and 6c show a fifth embodiment of the invention, in which the propulsion and steering arrangement of the stern portion of the watercraft is shown obliquely from below, from the side and from below and partially in cross-section.
Figure 6B:
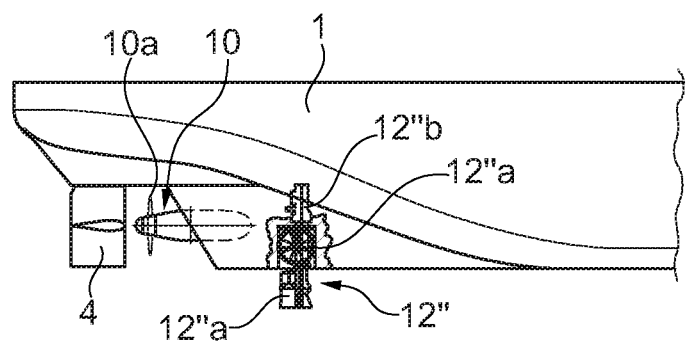
Figure 6C:
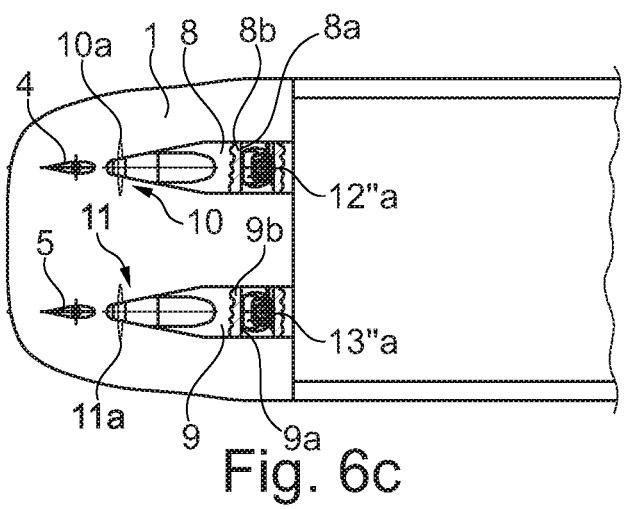

In the embodiment of FIGS. 6a, 6b and 6c, the thruster devices 12" and 13" are likewise ones that can be lowered down. In this case they have, however, two operating positions; when lowered down from the tunnel openings 8b and 9b, the propeller units 12"a and 13"a function as in the embodiment of FIG. 5, but in their retracted position, they affect via the transverse tunnel openings 8a and 9a like conventional tunnel thrusters. Both operating positions are shown on top of each other in FIG. 6b.

Figure 7A:
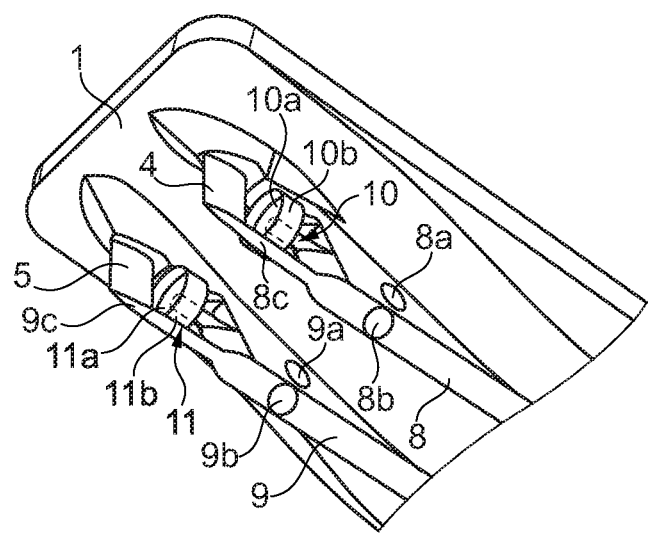
FIGS. 7a, 7b and 7c show a sixth embodiment of the invention, in which the propulsion and steering arrangement of the stern portion of the watercraft is shown obliquely from below, from the side and from below and partially in cross-section.
Figure 7B:
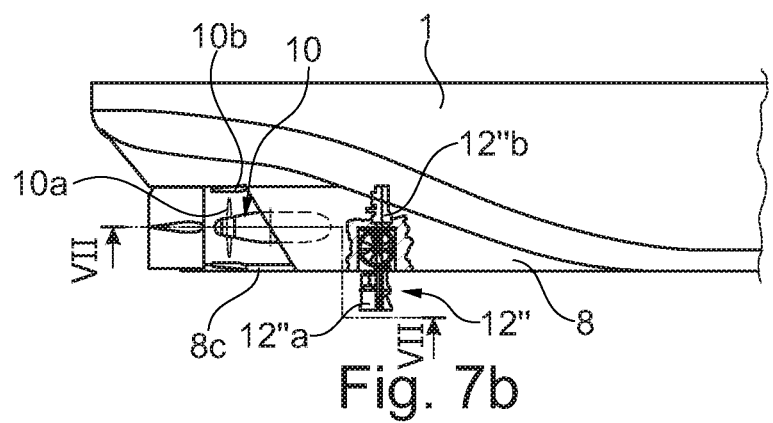
Figure 7C:
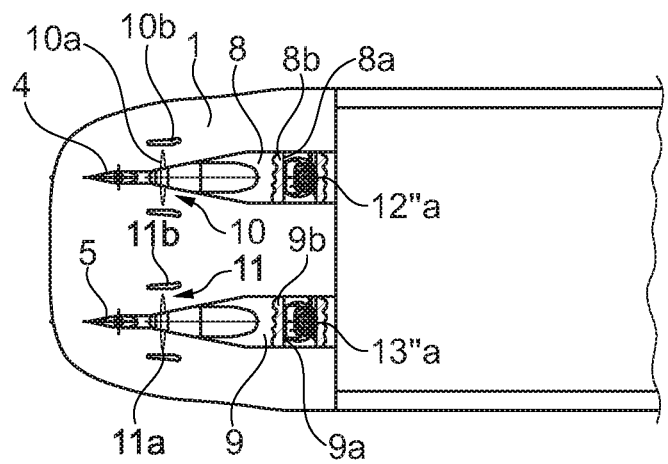

Once again, in the embodiment of FIGS. 7a, 7b and 7c, the propellers 10a and 11a are equipped with nozzles 10b and 11b and, additionally, the solution is equipped with support elements 8c and 9c.

Depending on need and use of space, in all embodiments, it can be used one or more of the above-described thruster device versions 12, 12' and 12" in each of the skegs 8 and 9.

The invention is not limited to the embodiments presented but many variations are conceivable within the scope of the appended claims.

The invention claimed is:

1. A watercraft having improved characteristics for travel in ice, comprising:
   a hull including a stern portion;
   a propulsion and steering arrangement provided at the stern portion of the hull;
   first and second skegs situated on opposite sides of a center line of the hull and extending in a longitudinal direction;
   a first propeller device located at a stern end or on a stern side of the first skeg;
   a second propeller device located at a stern end or on a stern side of the second skeg;
   a first thruster device positioned in the longitudinal direction between the first propeller device and the hull; and
   a second thruster device positioned in the longitudinal direction between the second propeller device and the hull;
   wherein each of the first and second thruster devices provides a water flow directed in a transverse direction relative to the center line of the hull.

2. A watercraft according to claim 1, wherein each of the first and second propeller devices comprises a steering thruster device having a fixed orientation.

3. A watercraft according to claim 1, wherein:
   the first propeller device is operatively coupled to a first motor located in the first skeg on a stern side of the first thruster device; and
   the second propeller device is operatively coupled to a second motor located in the second skeg on a stern side of the second thruster device.

4. A watercraft according to claim 1, wherein:
   the first propeller device is operatively coupled to a first motor located on a stern side of the first thruster device of the first skeg by a first vertical shaft and a first angle gear; and
   the second propeller device is operatively coupled to a second motor located on a stern side of the second thruster device of the second skeg by a second vertical shaft and a second angle gear.

5. A watercraft according to claim 1, wherein each of the first and second thruster devices comprises a tunnel thruster configured to direct water diagonally upward.

6. A watercraft according to claim 1, wherein:
   the first thruster device is movable from a first position, in which the first thruster device is disposed inside the first skeg, to a second position, in which the first thruster device is disposed outside of the first skeg, and
   the second thruster device is movable from a first position, in which the second thruster device is disposed inside the skeg, to a second position, in which the second thruster device is disposed outside of the second skeg.

7. A watercraft according to claim 6, wherein each of the first and second thruster devices is rotatable about a vertical axis extending in a direction of movement between the first and second positions.

8. A watercraft according to claim 6, wherein each of the first and second thruster devices, when in the first position, is configured to operate as a tunnel thruster oriented to direct a water flow diagonally upward.

9. A watercraft according claim 1, further comprising, a first rudder positioned on a stern side of the first propeller device, and a second rudder positioned on a stern side of the second propeller device.

10. A watercraft according to claim 1, wherein:
    the first propeller device includes a first propeller and a first nozzle surrounding the first propeller; and
    the second propeller device includes a second propeller and a second nozzle surrounding the second propeller.

11. A watercraft according to claim 9, wherein:
    the first rudder device is supported from below to the first skeg by a first support element; and
    the second rudder device is supported from below to the second skeg by a second support element.

12. A watercraft according to claim 10, wherein:
    the first nozzle is supported from below to the first skeg by a first support element; and
    the second nozzle is supported from below to the second skeg by a second support element.

* * * * *